Patented Dec. 19, 1950

2,534,227

UNITED STATES PATENT OFFICE 2,534,227

METHOD OF PREPARING PROTEIN FROM VEGETABLE SOURCES

Francis E. Calvert, Cincinnati, Ohio, assignor to The Drackett Company, Cincinnati, Ohio, a corporation of Ohio No Drawing. Application September 22, 1947, Serial No. 775,564

9 Claims. (Cl. 260—123.5)

This invention relates to an improved process for the treatment of proteinaceous materials of vegetable origin, and has for its principal object the preparation of a white or substantially white vegetable protein and of products and compositions containing such protein.

Protein substances have valuable and extensive application in many industrial processes. They are used in the paper industry as the basis of a coating or size for paper, in the plactics industry generally, and in the fabrics field in the form of synthetic fibers. In many of these fields, it is essential that the protein employed be substantially free from color, and the difficulty of producing a light colored or white protein from vegetable sources has proved a serious limitation on the extent of use of such protein.

Thus the final color of dry proteins prepared from vegetable sources may vary from black to light yellow, the more common intermediate shades being dark brown, red, red-brown, and light brown. It can be shown that in protein obtained by existing methods, the color depends primarily upon the particular seeds from which the protein is isolated, and upon the method of isolation. As heretofore produced, most of the vegetable protein is unsatisfactory in the preparation of paper coating, sizings for light colored wall papers, button stock, and for use in other fields in which the final product must be light in color, unless heavily pigmented with white pigments. Pigmentation, however, results in reduction in strength and transparency of the product, and is therefore undesirable.

I have discovered that the coloration observed in such proteins is largely the result of oxidation which occurs in the normal processing of the vegetable material to obtain the protein substance therefrom, the native protein in the bean or seed being usually nearly white or colorless. The oxidation of the protein is a biological phenomenon, catalyzed by oxidative enzymes which are present in the plants or seeds. Apparently this biological oxidation is a protective mechanism developed by the plant to protect it against mechanical injury, the several phases of the process being essentially as follows:

1. Mechanical injury liberates oxidizing enzymes and a chromogenic substance.

2. The oxidating enzymes, utilizing oxygen from the air or water contained in the vegetable substance, oxidize the chromogenic substance (probably a phenol) to produce a quinone.

3. The quinone (probably an ortho-quinone) acts as an antiseptic to kill bacteria at the point of injury, thus preventing decay.

4. The quinone simultaneously tans the protein at the point of exposure to produce a mechanical barrier in the nature of scar tissue, preventing further entrance of bacteria.

5. The quinone polymerizes to an insoluble brown pigment.

It should be noted that in the normal processing of protein-yielding vegetable raw materials for the production of protein, the raw materials are subjected to mechanical injury and the formation of a darkly colored product is thus immediately initiated.

It thus appears that three factors contribute to the formation of color in vegetable proteins during processing of the source material, namely oxidizing enzymes, oxygen, and chromogenic or aromatic substances, and that if one of these factors is absent, or chemically or physically inhibited or repressed, the protein should be substantially white. From a practical standpoint, however, I have found that it is impossible to remove completely any one of these factors without destroying or harming the proteins. On the other hand, I have found that if two of these factors are isolated as completely as is practicable, the resulting protein is substantially without color.

My prior application for U. S. Letters Patent, Serial No. 707,973, filed November 5, 1946, now Patent No. 2,451,659, relates generally to the removal or inhibition of two or of all three of these factors, preferably the oxidizing enzymes and oxygen. The instant application deals more particularly with a species of the broader method, which involves inhibiting enzyme reaction by acid extraction of protein from its vegetable source. Thus as pointed out in the aforesaid application, I have discovered that when the pH of the raw material is lowered to a value below 2.0, the acid itself acts as an enzyme inhibitor, and substantially colorless or white protein may be obtained with the addition of a blanketing agent only, no further enzyme inhibitor being required.

Thus it is an object of the invention to produce a white or nearly colorless protein by acid extraction of the protein from oleaginous seed materials, such as the soybean, peanut, cottonseed, and the like, in conjunction with the employment of an oxygen excluding or blanketing agent, whereby enzyme activity is minimized and oxygen is removed from contact with the protein molecule. As an adjunct to this treatment, the invention contemplates the removal of chromogenic substances from the vegetable source, for instance by extraction from the raw material with lower primary alcohols, such as methanol or ethanol.

Typical methods of practicing this invention are set forth in the following specific examples, it being understood that these examples are illustrative only and are not to be construed as limiting the scope of the invention as elsewhere defined.

Example I

Two hundred and fifty (250) grams of ground whole soybeans, containing all the natural oil, were placed in a bath containing 3,000 ml. of tap water, 1.3 grams of $NH_4SCN$ and 1.3 grams of $Na_2S_2O_5$. After the flakes were wet with water, 70 grams of 75% $H_3PO_4$ were added. The pH of the solution was 1.98. After extracting for 30 minutes, the solution was strained, centrifuged, and precipitated by adding $NH_4OH$ to obtain a pH of 4.40. The precipitate was collected and dried in an air oven at 45° C. The dry protein was extracted with petroleum ether to separate the oil from the protein. The petroleum ether was allowed to evaporate off; the resultant protein was white with a faint tinge of yellow. This protein was opaque rather than glassy.

Example II

Two hundred and fifty (250) grams of freshly flaked soybeans, containing all their natural oil, were added to 3,000 ml. of tap water at 48° C., containing 70 grams of 85% $H_3PO_4$. The pH of the mixture 5 minutes after adding the flakes was about 1.9. The mixture was stirred slowly for 30 minutes, after which it was strained, centrifuged, heated to 75° C., and precipitated by adding dilute NaOH to attain a pH of 4.58. The precipitated protein was collected by filtration and dried in an air oven at 45° C. The natural oil was extracted from the protein with petroleum ether. The dry protein was an opaque product, very light in color, and very friable.

Example III

Two hundred and fifty (250) grams of soybean flakes, containing all their natural oil, were placed in a bath containing 3,000 ml. of water, 1.3 grams of $NH_4SCN$ and 70 grams of 85% $H_3PO_4$. The pH of the bath after the addition of the flakes was 1.80. The mixture was stirred for 30 minutes, after which it was strained, centrifuged, heated to 75° C., and precipitated by adding KOH solution to obtain a pH of 4.60. The precipitate was collected by filtration and dried in an air oven at 45° C. The natural oil was separated from the protein by solvent extraction. The dried protein was white, slightly tinged with brown.

Example IV

The source of protein in this example was 200 grams of substantially oil free soybean flakes which were stored in hexane until just before using. The extraction agent was phosphoric acid and the blanketing material octyl alcohol. The hexane was removed from the 200 grams of soybean flakes by air drying in an open pan. After the hexane had evaporated the flakes were wet with an excess of octyl alcohol, allowed to stand 10 minutes, and the excess drained off. The flakes were then placed in an aqueous bath composed of (a) 300 ml. of water at 48° C., and (b) 70 grams of 85% phosphoric acid. The pH of solution before adding flakes was 1.35. Five minutes after adding the flakes the pH was 1.82. After stirring 30 minutes the flakes were separated from the liquid by straining through cheesecloth, the liquor clarified by centrifuging, and heated to 75° C. The protein was precipitated by adding sodium hydroxide to make pH of solution 4.45. The curd was removed by filtering, and dried in an air oven at 45° C. The dried protein was opaque, very friable, and was white in color with slight reddish undertone.

While the lightest colored proteins are obtained when the blanketing agent is present during the entire period of the isolation procedure, material improvement may be effected by introducing the agent at any time during the process or even immediately prior to the drying of the protein curd, presence of the agent during the drying period being essential. For this reason it is believed that the blanketing agents perform a function in addition to the exclusion of air or oxygen which may be briefly described as an anti-aggregation effect, the formation of giant molecules by the joining of molecules during the drying period being retarded or prevented by the agent. A possible explanation of this function is as follows:

The wet proteins are highly swollen by water and have water between their molecules. As this water is removed, the protein molecules attract each other through secondary forces and thus aggregate to large molecules. However, when a blanketing agent is present, this agent gradually enters the area occupied by the water as the water is removed, thus physically preventing the protein molecules from aggregating or packing together. The protein is then freed of practically all water by, for example, drying and thus becomes rigid. Removal of the blanketing agent by an organic solvent that is unable to swell the protein then leaves the protein in a distended low molecular weight condition containing many voids of molecular size like a sponge. This would be one way of explaining another effect observed, namely, that proteins prepared by my invention dissolve much more rapidly in protein solvents than proteins prepared by ordinary procedures.

In this connection it may be pointed out that by the practice of my invention, improved results other than in the whiteness of the protein are achieved. For instance, when protein, prepared by conventional methods of acid extraction, is soaked in water for 30 minutes and then dissolved by the addition of caustic soda, a tremendous swelling occurs, finally resulting in a gel. In order to break down this gel, and obtain a thin solution, the protein must be heated and mechanically stirred. In contrast, protein prepared in accordance with the present invention, when similarly soaked in water and dissolved with caustic soda, swells momentarily and then almost immediately breaks down into a thin solution, without the aid of heat or mechanical agitation. It is believed that by the present process, the protein is brought to such physical condition that the alkali immediately dissolves the same without a prolonged swelling and gelation period, and that the blanketing agent is chiefly responsible for this result.

Substances which may be successfully employed as blanketing agents are quite numerous and vary widely in chemical and physical properties. Extensive experimentation shows that satisfactory blanketing agents are substances which may be defined as consisting essentially of liquid organic compounds having low solubility in water, capable of forming an adsorption compound with the protein or pyrotein-chromogen complex, and by reason of this adsorption phenomenon effectively excluding oxygen from contact with the protein or protein-chromogen complex molecule. That an adsorption compound is formed appears reasonably certain from experimental data. For instance, if hexane is the blanketing agent, the isolated protein can be dried at 60° C. under reduced pressure for a period of time sufficient to insure the removal of all the hexane from a mechanical mixture. However, if the protein is then stored for a short period in a closed container, the characteristic odor of free hexane is developed in the container in a short time. It is believed that the molecules of the blanketing agent adhere to the protein molecules in an extremely thin layer and that the adsorption phenomenon accomplishes the following results:

1. Excludes oxygen.
2. Prevents molecular aggregation.
3. Possibly insulates that portion of the molecule which can combine with the oxidized chromogen or other substances.

In the following table are listed substances which are typical of various classes of chemical compounds, certain characteristics of each compound and the degree of protection afforded thereby being indicated.

stituted for those employed in the foregoing specific examples with good results.

As hereinbefore indicated, satisfactory enzyme inhibiting action is achieved in the practice of the invention when the pH value of the extracting bath is less than 2.0, and the maximum value is critical, the effectiveness of the treatment falling off rapidly as the pH is increased above 1.83, which is the practical upper limit. Optimum results are achieved by a pH value of about 1.0. The temperature of the extracting solution is not critical; normal or slightly elevated temperature is satisfactory.

The acid selected for the extraction step in the practice of the present invention is not critical, it being necessary only to employ an acid or acid salt which is capable of reducing the pH value of the extracting medium to less than 2.0. I prefer to employ mineral acids, principally sulphuric, sulphurous, and phosphoric acids. Hydrochloric acid is effective in inhibiting enzyme activity, but is much less desirable, since chlorine compounds tend to impart to the product a pinkish tinge.

The effect of the acid in inhibiting enzyme activity tends to persist for some time after neutralization of the acid, and if the remaining steps of the isolation procedure are carried out without delay, no pronounced enzyme activity develops during the critical drying period. However, as a matter of precaution, especially where

*Blanketing agents tested with soy protein*

| | Effective protection | B. P., °C. | Solubility in water | Specific gravity |
|---|---|---|---|---|
| Esters: | | | | |
| Tributyl citrate | Complete | 233.5 (22 mm.) | Insoluble | 1.046 |
| Dibutyl phthalate | do | 230 | .04% | 1.048 |
| Dimethyl phthalate | do | 296 | .45% | 1.192 |
| Butyl lactate | do | 140–200 | 3.4% | .979 |
| Tributyl phosphate | do | 180 (25 mm.) | .6% | .973 |
| Tri-octyl phosphate | do | | Insoluble | .962 |
| Ethyl acetate | None | 102–173 | 9.7% | .885 |
| Ethers: | | | | |
| Diethyl | None | 40 | 7.5% | .832 |
| Dibutyl | Complete | 142 | Slightly soluble | .784 |
| Diamyl | do | 190 | Insoluble | .774 |
| Open Chain Alcohols: | | | | |
| Ethanol | None | 78 | All proportions | .789 |
| n Butanol | do | 117 | 7.9% | .809 |
| n Amyl | 5% | 138 | 2.7% | .814 |
| 2 Pentanol 4 Methyl | 50% | 131.8 | 1.7% | .808 |
| n Hexanol | Complete | 157.2 | .59% | .820 |
| Capryl | do | 122 | .538% | .819 |
| Ethyl hexanol (octyl) | do | 183.5 | .10% | .834 |
| Lauryl | do | 37.6 (M. P.) | Insoluble | .830 |
| Hydrocarbons: | | | | |
| Petroleum ether | Complete | 36–40 | .036% | .626 |
| Hexane | do | 69 | .013% | .660 |
| Kerosene | do | | Insoluble | |
| Mineral oil | do | | do | |
| Benzene | do | 80 | .082% | .879 |
| Cyclohexane | do | 81.4 | Insoluble | .779 |
| Dry cleaners Naphtha | do | 93–98 | do | .742 |
| V. M. & P. Naptha | do | 110–115.6 | do | .752 |
| Mineral spirits | do | 148.9–154.4 | do | .774 |
| Chlorinated hydrocarbons: | | | | |
| Ethylene dichloride | 50% | 83.5 | .92% | 1.257 |
| Carbon tetrachloride | Complete | 76–7 | .08% | 1.595 |
| Amines: | | | | |
| n Butyl | None | 77.8 | All proportions | .740 |
| n Hexyl | do | 132.7 | Slightly soluble | |
| Vegetable Oils: | | | | |
| Linseed | Complete | | Insoluble | |
| Cottonseed (bleached and refined) | do | | do | |
| Soybean | do | | do | |
| Miscellaneous: | | | | |
| Pine oil | do | | Insoluble | |
| Nitrobenzene | do | 211 | Very slightly | 1.205 |
| Cyclohexanol (Technical Grade) | do | 161.5 | 3.0% (approx.) | .945 |

An examination of the above list indicates that solubility in water is an important factor in determining the effectiveness of a compound as a blanketing agent, and that in general solubilities of less than 1% appear desirable; of the effective agents here listed, none has a solubility of more than 4%. All of the agents indicated above as effective in blanketing the protein may be substituted for those employed in the foregoing specific examples with good results.

the completion of the isolation step is likely to be delayed, I find it sometimes desirable to introduce one of the enzyme inhibiting agents employed in the practice of the invention described in my earlier application, usually prior to or during the precipitation of the protein.

Such enzyme inhibiting agents, optional in the practice of the present invention, may be selected from widely varying chemical compounds, as is indicated by the following list, representative of various types of effective chemicals:

1. Hydrocyanic acid and soluble cyanides (NaCN, etc.).
2. Thiocyanic acid and soluble thiocyanates ($NH_4SCN$, etc.).
3. Hydrofluoric acid and soluble fluorides (NaF or $NH_4FHF$, etc.).
4. Phosphoric acid and soluble phosphates like sodium phosphates, sodium hexametaphosphate, tetrasodium pyrophosphate.
5. Hydrazoic acid and soluble azides ($NaN_3$, etc.).
6. Hydroxylamine, hydrazine, etc.
7. Thiourea.
8. Carbon monoxide.
9. Sodium diethyldithiocarbamate.
10. Ascorbic acid.
11. Cysteine and salts.
12. Hydrogen sulfide and soluble sulfides like ($Na_2S$).
13. Sulfites, thiosulfates, hydrosulfites, bisulfites, and $SO_2$.

Some inhibitors are effective with respect to certain oxidizing enzymes, for example oxalacetic acid, nicotinic acid amide, iodoacetic acid, pyruvic acid.

Sometimes greater effectiveness has been attained by combining two of the above inhibitors such as $NH_4SCN$ and $Na_2S_2O_5$ or NaCn and $Na_2SO_3$, etc.

Considerable attention has been given in the past to the subject of enzyme inhibitors, and the substances effective for this purpose are mentioned in the literature. It will be understood, however, that the use of agents exerting a detrimental effect on the protein should be avoided, and in general, I prefer the less rigorous enzyme inhibitors. An enzyme inhibitor may be defined as any substance which interferes with or retards the chemical reaction normally occurring as the result of the presence of an enzyme. Consequently, the inhibitor may be a compound which combines with either the protein or the prosthetic group of the enzyme to render the same inactive, or in some instances it may combine with both groups. Other substances may inhibit enzyme activity by removing the substrate, or the material upon which the enzyme acts. Thus I may employ reducing agents to remove the substrate peroxide. Prolonged heating destroys the enzyme, but is undesirable because of the adverse effect on the protein.

I prefer to employ sodium hydroxide to precipitate the protein from the extracting solution, but I have successfully used other alkali metal hydroxides and ammonia. Any other agent, capable of raising the pH value to the extent necessary to precipitate the protein, may be used, the practice of the invention not being dependent upon the use of any particular agent. In fact, I may employ other methods, not involving the use of an alkaline agent, to precipitate the protein. Thus I may heat the solution under vacuum to remove the extracting acid to an extent sufficient to bring the solution to the isoelectric point.

My process is especially effective as applied to protein derived from soybean, but the improvement in other vegetable materials, for instance protein substances obtained from the peanut or the cottonseed, is also quite evident even from cursory visual inspection. The following examples indicate the nature of the results achieved with the use of various blanketing agents, a photoelectric reflection meter being used to measure the color of the dry protein samples. This instrument gives readings which may be described in tri-stimulus terms. Three filters, amber (A), blue (B), and green (G), are used. The combination of object with light bulb, filters and photocell of the apparatus is optically "equivalent" to the stimuli which the average eye receives from the object in question. Thus from the readings of the meter and the application of a few simple formulae the color of a solid substance can be established objectively. For the present purpose, a suitable description of color can be established by determining luminance and "yellowness." Because the samples showed a yellow hue of practically identical dominant wave length, "yellowness" as described by Hunter in National Bureau of Standards Circular C-429 is an effective way of determining the actual amount of color present in the sample.

Luminance, often called apparent brightness, is the percentage of visual radiant energy incident on the sample that is transmitted. This is essentially the "gray" value of the sample, the percentage of light reflected back to the eye independent of any color. Perfect white has a luminance of 100%; perfect black 0%.

"Yellowness" is calculated as follows:

$$J = \text{yellowness} = \frac{A-B}{G}$$

For a white or perfectly gray surface $J=0$; the more strongly colored a yellow substance is, the higher will be the value of J. For bluish colors this value becomes negative.

In the accompanying chart, therefore, the G filter reading shows the "apparent brightness" or "gray" value of the sample much as the human eye would detect this quality. The yellowness value is a measure of the amount of actual color (yellow) present. In order to secure reproducible readings the protein samples are all ground to the same mesh size of $-48$ to $+65$. The samples which have the highest G reading, and yellow values closest to zero, are the whitest.

The first four samples in the chart were prepared respectively in accordance with Examples I to IV, hereinbefore set forth. The last sample was prepared in accordance with a typical isolation method using acid as a protein solvent, the pH of the extracting solution being approximately 2.0, but employing no blanketing agent, and is introduced for the purpose of comparison.

*Reflectance values of extracted protein samples using acid as protein solvent and enzyme inhibitor*

| Sample Number | Green Filter | Amber Filter | Blue Filter | Yellowness |
|---|---|---|---|---|
| I | 60.5 | 66.0 | 45.7 | 0.338 |
| II | 69.7 | 72.7 | 56.2 | 0.237 |
| III | 71.9 | 75.7 | 58.9 | 0.234 |
| IV | 71.9 | 75.7 | 57.8 | 0.249 |
| V | 32.0 | 38.4 | 17.0 | 0.657 |

If a blanketing agent which is heavier than water is used, care must be taken not to remove the agent during centrifuging; if the blanketing agent is relatively non-volatile, it may be necessary to extract it after the protein is dried. Suitable variations in procedure such as these will readily be made by those skilled in the art.

The amount of the blanketing agent employed is not critical and may vary widely. It must, of course, be present in amount sufficient to perform the intended purpose, but need not be employed in quantities substantially in excess of that amount. The number of agents which are suitable for the purpose is so large that it is not feasible to recite percentage ranges in each instance, but suitable proportions are indicated by the foregoing specific examples. As indicated in several examples, the natural oil of the seed material may be used as the blanketing agent.

A brilliant white protein is obtained by the application of my method to flakes from which the oil has been extracted by ethanol or methanol to effect partial removal of chromogens prior to extraction of the protein. It will be observed that this practice involves control or elimination of all three factors which tend to impart color to the protein, since it involves removal of chromogens, inhibition of enzyme action, and exclusion from oxygen.

It will be appreciated that in the ultimate use of protein obtained by my method, wherein the dried protein is redissolved, care may again be exercised to insure that the protein does not become discolored while in solution. The preferred method of preventing such discoloration is the conjoint exclusion of oxygen and inhibition of enzyme activity. However, protein prepared by my method and redissolved without the exercise of special precautions is distinctly lighter than redissolved protein prepared by conventional commercial methods.

Having thus described the invention, what is claimed as new and desired to be secured by Letters Patent is:

1. A method of minimizing the formation of color in protein during isolation from oleaginous seed materials by the process of treating the material with an acid solvent for protein at a pH less than 2.0, precipitating the dissolved protein with an alkaline agent, and filtering and drying the precipitate, which includes the steps of introducing in effective amount during the isolation process and prior to the drying of the protein a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium.

2. A method of obtaining a substantially colorless or white protein from oleaginous seed materials, which includes the steps of isolating protein from the protein at a pH less than 2.0, adjusting the pH of the solution to the isoelectric point to precipitate the protein, separating and drying the protein, and introducing in effective amounts during the isolation process and prior to the drying of the protein a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium.

3. A method of obtaining a substantially colorless or white protein from oleaginous seed materials, which includes the steps of adding to the material a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium, treating the material with an acid solvent for the protein at a pH less than 2.0, adding an alkaline agent to the solution to precipitate the protein, and separating the protein from the solution.

4. A method of obtaining a substantially colorless or white protein from soybean, which includes the steps of extracting oil from the soybean with a lower aliphatic primary alcohol, adding to the defatted material a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium, treating the material with an acid solvent for the protein at a pH less than 2.0, adjusting the pH of the solution to precipitate the protein, and separating the protein from the solution.

5. A method of obtaining a substantially colorless or white protein from soybean, which includes the steps of extracting oil from the soybean with an oil solvent, adding to the defatted material a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium, treating the material with an acid solvent for the protein at a pH less than 2.0, adding an alkaline agent to the solution to precipitate the protein, and separating the protein from the solution.

6. A method of obtaining a substantially colorless or white protein from oleaginous seed materials, which includes the steps of treating the material, containing the natural oil, with an acid solvent for the protein at a pH less than 2.0, adding an alkaline agent to precipitate the protein, separating the protein from the solution, drying the protein, and thereafter treating the protein with a solvent for the oil to remove the latter, the natural oil being present in amount substantially in excess of the amount soluble in the aqueous medium.

7. A method of obtaining a substantially colorless or white protein from oleaginous seed materials, which includes the steps of isolating protein from the material by treating the same with an acid solvent for the protein at a pH less than 2.0, adjusting the pH of the solution to precipitate the protein, separating and drying the protein, and introducing in effective amounts during the isolation process and prior to the drying of the protein an enzyme inhibiting agent and a blanketing agent, said blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium.

8. A method of obtaining a substantially colorless or white protein from oleaginous seed materials, which includes the steps of isolating protein from the material by treating the same with a mineral acid solvent for the protein at a pH less than 2.0, adjusting the pH of the solution to precipitate the protein, separating and drying the protein, and introducing in effective amounts during the isolation process and prior to the drying of the protein a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium.

9. A method of obtaining a substantially colorless or white protein, which includes the steps of isolating protein from the material by treating the same with dilute acid at a pH less than 2.0, adding sodium hydroxide to precipitate the protein, separating and drying the protein, and introducing in effective amounts during the isolation process and prior to the drying of the protein a blanketing agent comprising a liquid organic compound having low solubility in water, and capable of forming an adsorption compound with protein to exclude oxygen from contact with the protein molecule, the amount of blanketing agent being substantially in excess of the amount soluble in the aqueous medium.

FRANCIS E. CALVERT.

REFERENCES CITED

The following references are of record in the file of this patent:

UNITED STATES PATENTS

| Number | Name | Date |
|---|---|---|
| 1,794,105 | David et al. | Feb. 24, 1931 |
| 1,917,734 | Rewald | July 11, 1933 |
| 2,132,434 | Rauer et al. | Oct. 11, 1938 |
| 2,194,835 | Nickerson | Mar. 26, 1940 |
| 2,331,619 | Morse | Oct. 12, 1943 |
| 2,451,659 | Calvert | Oct. 19, 1948 |